United States Patent
Oran

(10) Patent No.: US 9,800,634 B2
(45) Date of Patent: Oct. 24, 2017

(54) PULL-BASED MEDIA SYSTEM

(71) Applicant: CISCO TECHNOLOGY, INC., San Jose, CA (US)

(72) Inventor: David R. Oran, Cambridge, MA (US)

(73) Assignee: Cisco Technology, Inc., San Jose, CA (US)

(*) Notice: Subject to any disclaimer, the term of this patent is extended or adjusted under 35 U.S.C. 154(b) by 301 days.

(21) Appl. No.: 13/903,545

(22) Filed: May 28, 2013

(65) Prior Publication Data

US 2014/0359150 A1    Dec. 4, 2014

(51) Int. Cl.
| | |
|---|---|
| G06F 15/16 | (2006.01) |
| H04L 29/06 | (2006.01) |
| H04N 21/24 | (2011.01) |
| H04N 21/61 | (2011.01) |
| H04N 21/647 | (2011.01) |
| H04N 21/854 | (2011.01) |

(52) U.S. Cl.
CPC .......... *H04L 65/60* (2013.01); *H04L 65/4084* (2013.01); *H04N 21/2402* (2013.01); *H04N 21/6125* (2013.01); *H04N 21/64761* (2013.01); *H04N 21/85406* (2013.01)

(58) Field of Classification Search
CPC . H04L 65/4084; H04L 65/60; H04L 65/4076; H04L 29/06462; H04L 29/06476; H04L 29/06517
See application file for complete search history.

(56) References Cited

U.S. PATENT DOCUMENTS

| | | | | |
|---|---|---|---|---|
| 8,122,102 | B2* | 2/2012 | Wein et al. | 709/219 |
| 8,813,245 | B1* | 8/2014 | Corley et al. | 726/27 |
| 8,880,587 | B2 | 11/2014 | Cobb et al. | |
| 2005/0102260 | A1* | 5/2005 | Spring | G06F 17/30056 |
| 2008/0225850 | A1 | 9/2008 | Oran et al. | |
| 2008/0244082 | A1* | 10/2008 | Shen et al. | 709/232 |
| 2008/0285452 | A1 | 11/2008 | Oran | |
| 2008/0285463 | A1 | 11/2008 | Oran | |
| 2011/0107379 | A1* | 5/2011 | Lajoie et al. | 725/87 |
| 2012/0144445 | A1* | 6/2012 | Bonta et al. | 725/116 |
| 2013/0103785 | A1 | 4/2013 | Lyon et al. | |
| 2013/0254333 | A1* | 9/2013 | Lyon | H04N 21/2385 709/217 |

FOREIGN PATENT DOCUMENTS

WO    WO 01/52497 A2    7/2001

* cited by examiner

*Primary Examiner* — Esther B Henderson
(74) *Attorney, Agent, or Firm* — Cindy Kaplan

(57) ABSTRACT

In one embodiment, a method includes generating a request for media at a publisher and transmitting the request to a media pipeline, the media transmitted from the media pipeline to a distribution pipeline. The media pipeline includes a chain of streaming media processing components, the chain dynamically configured by the publisher. An apparatus and logic are also disclosed.

20 Claims, 4 Drawing Sheets

PULL-BASED MEDIA SYSTEM

TECHNICAL FIELD

The present disclosure relates generally to communication networks, and more particularly, to media systems.

BACKGROUND

A typical headend for a media distribution system includes a number of processing elements. In conventional systems, elements such as encoders, transcoders, encapsulators, and publishing and storage devices reside in separate systems, which are loosely coupled to one another due to the legacy of broadcast television where transmission was one-way and broadcast based.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
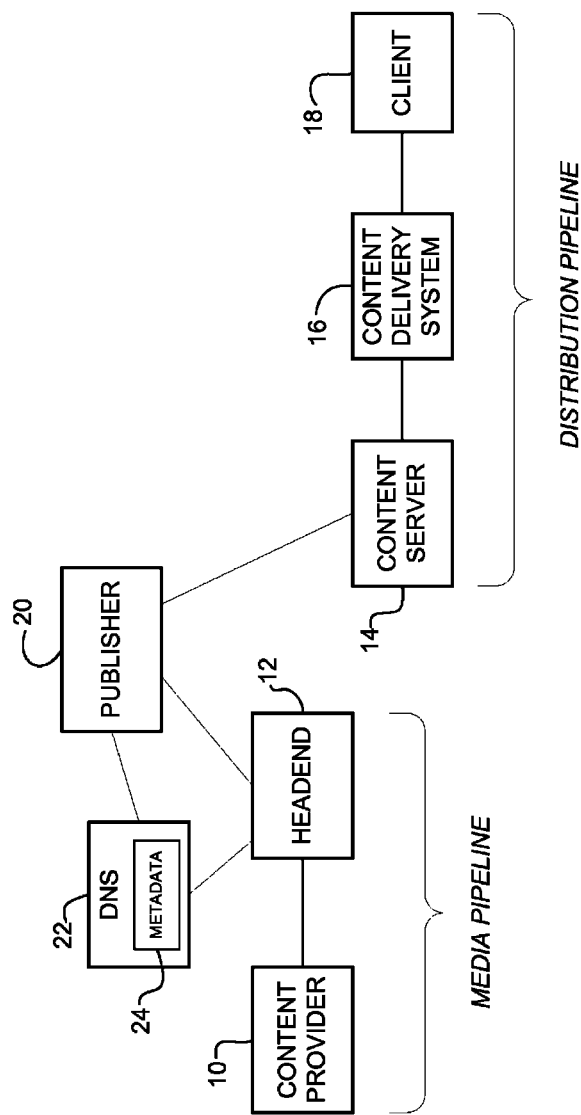
FIG. 1 illustrates an example of a network in which embodiments described herein may be implemented.

In one embodiment, a method generally comprises generating a request for media at a publisher and transmitting the request to a media pipeline, the media transmitted from the media pipeline to a distribution pipeline. The media pipeline includes a chain of streaming media processing components, the chain dynamically configured by the publisher.

In another embodiment, an apparatus generally comprises a processor for generating a request for media at a publisher and transmitting the request to a media pipeline, the media transmitted from the media pipeline to a distribution pipeline. The apparatus further comprises memory for storing an identifier for the media pipeline. The media pipeline includes a chain of streaming media processing components, the chain dynamically configured by the publisher.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

A headend for a media system may include, for example, primary capture (if at an origination site), primary encoders (if at a primary distribution site), secondary encoders, stat-muxes, and de-multiplexers (if at secondary distribution sites such as cable headends receiving media from a satellite or terrestrial distribution via SPTS (Single Program Transport Stream) or MPTS (Multiple Program Transport Stream) broadcast/multicast), transcoders (for IP-based content distribution including live VoD (Video on Demand) and involving multi-rate transcoding for ABR (Adjustable Bit Rate) systems, encapsulators to accommodate multiple streaming formats, and publishing and storage devices for handing the content over to the distribution system.

In conventional systems, these elements reside in separate systems that are loosely coupled to each other. In order to make them work together, a management system is used to individually provision each element so that the entire group of processing elements works together consistently. This results in a complex management system that needs to provide load balancing, health monitoring, failover, resilience, and robustness. Since the entire system is dependent on this management system, the management system itself must be made highly reliable. Furthermore, if components of the headend are geographically distributed, an instance of the management system has to reside in each location in order to provide robustness against site failures.

The embodiments described herein provide a web-oriented pull-based pipeline for processing media in a streaming media headend system that can receive various types of primary input. As described in detail below, the pipeline is under control of a publisher located at the end of a multi-stage process. This allows for the building of a flexible media pipeline on demand that spans processes, virtual machines, physical machines, and network sites. The embodiments allow for the construction of media pipelines on the fly, without the need for a management system to coordinate all of the individual elements, while allowing for naming, load distribution, and failure recovery techniques that map well onto current data center and cloud service technologies.

Referring now to the drawings, and first to FIG. 1, an example of a network in which embodiments described herein may be implemented is shown. For simplification, only a small number of nodes are shown. The network includes a media pipeline and a distribution pipeline interconnected via a publisher 20. In the example shown in FIG. 1, the media pipeline includes a content provider 10 and headend 12. As described below with respect to FIG. 3, the headend 12 may include any number or type of processing components. The media pipeline comprises a chain of streaming media processing components that can receive different types input (e.g., satellite multiplexed broadcast, file ingest, terrestrial IP multicast, and the like) from the content provider 10. The content provider 10 may be, for example, a content provider of broadcast video (e.g., cable company, digital satellite company), content delivery node, server, etc.

The distribution pipeline includes a content server 14, content delivery system 16, and client 18. The content server 14 may be, for example, a server (e.g., origin server) that stores the data locally or obtains the data from another server or media source via a network, satellite, cable, or any other communication device. The content server 14 takes the packaged content received from the publisher 20 (or directly from the media pipeline), stores the content, and provides fragments based on end-user requests. The incoming packaged content can be archived for later use and the server can republish the packaged content to other servers distributed in the network.

The content delivery system 16 may include, for example, TV streaming applications for content delivery to digital televisions and set-top boxes, and Internet streaming applications for content delivery to IP devices such as personal computers, mobile phones, and handheld devices. The content delivery system 16 may include any number or type of network devices or networks in communication with any number of clients (end users) 18. The client 18 may be, for example, a personal computer, media center device, mobile device (e.g., phone, personal digital assistant, digital media player, tablet, multimedia device), set-top box, desktop computer, laptop computer, host, server, or any other device capable of media (e.g., audio, video, or data) exchanges within the network.

The media pipeline and distribution pipeline are connected via publisher 20. The publisher 20 may be, for example, an application residing at a network device. The publisher 20 may also be located at a component within the distribution pipeline (e.g., origin server) or media pipeline (e.g., headend). Any number or type of network devices (e.g., routers, switches, gateways, servers) may be inserted in the media or distribution pipelines and the pipelines may traverse any number of networks (e.g., local area network, metropolitan area network, wide area network, enterprise network, data center, Internet, intranet, radio access network, public switched network, or any other network or combination thereof).

As described in detail below, the media pipeline is pull-based rather than push-based in the control plane. The publisher 20 dynamically configures the chain of processing components that make up the media pipeline. Each instance of the media pipeline is independent and the elements in the chain share fate (simplifying failure recovery). In one embodiment, redundancy and failure recovery are accomplished by replicating pipelines explicitly instantiated at the publisher 20. The media pipeline is initiated from the tail (publisher 20). This ensures that only media streams that are actually wanted by the distribution system are actively processed. The publication operation is independent from content fetch transactions by content viewers.

In one embodiment, the media pipeline is built from elements that accept HTTP (Hypertext Transfer Protocol) connections from downstream elements and issue HTTP connections to upstream elements. The term downstream as used herein refers to the direction that in a conventional system, the content provider 10 would transmit media towards the client 18. Thus, the headend 12 accepts HTTP connections from the publisher 20.

The network further includes one or more DNS (Domain Name System) servers 22 in communication with the publisher 20 and components of the headend 12. In one example, the DNS 22 may be augmented with a pre-provisioned database of metadata 24 describing media content. The metadata description is carried through the media pipeline, allowing each element in the pipeline to make use of the metadata elements relevant to its individual processing role, rather than confining it in the management system. This allows for new pipeline elements to be inserted without disturbing the other pipeline elements or a central management system. As described below, the DNS 22 may operate to perform load balancing within the media pipeline.

It is to be understood that the network shown in FIG. 1 and described herein is only an example and that the embodiments may be implemented in networks having different network topologies or network devices, without departing from the scope of the embodiments.

Figure 2:
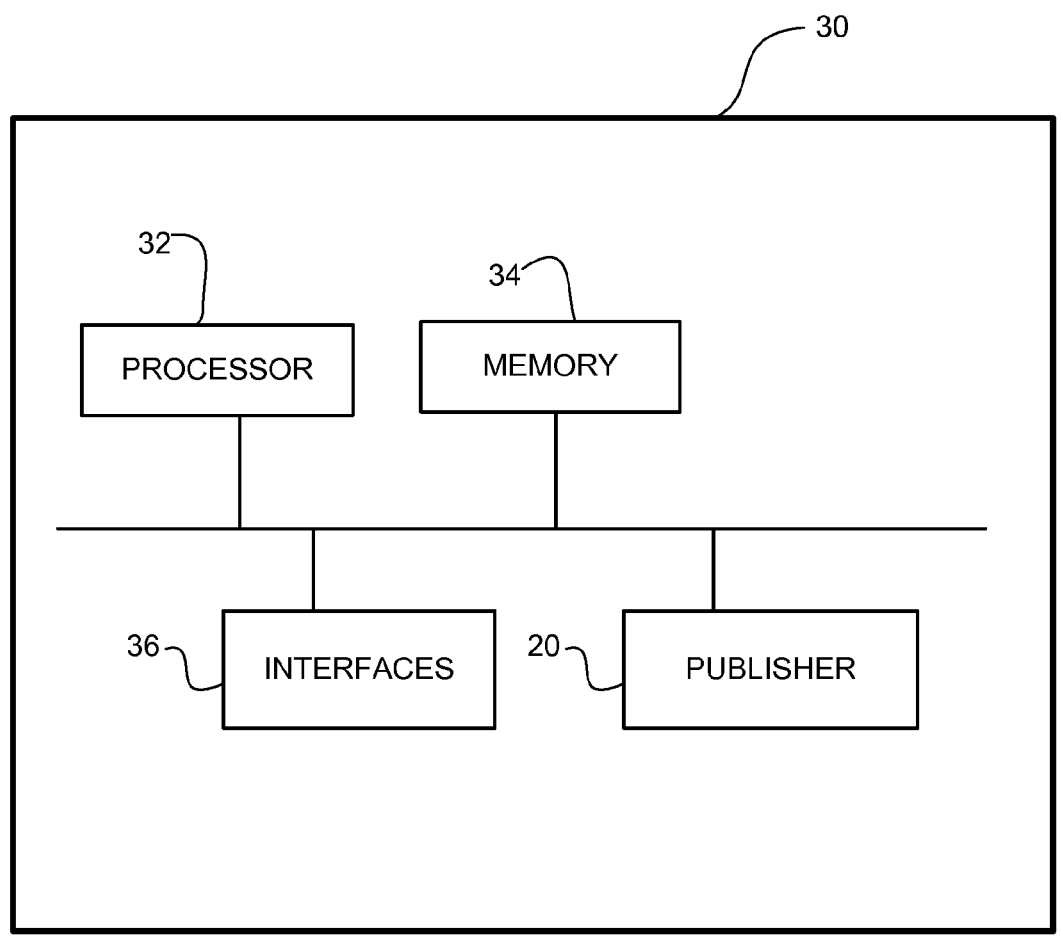
FIG. 2 depicts an example of a network device useful in implementing embodiments described herein.

FIG. 2 illustrates an example of a network device 30 (e.g., node containing publisher 20) that may be used to implement the embodiments described herein. In one embodiment, the network device 30 is a programmable machine that may be implemented in hardware, software, or any combination thereof. The network device 30 includes one or more processor 32, memory 34, and network interfaces 36. Memory 34 may be a volatile memory or non-volatile storage, which stores various applications, operating systems, modules, and data for execution and use by the processor 32. For example, the publisher 20 may comprise code stored in memory 34.

Logic may be encoded in one or more tangible media for execution by the processor 32. For example, the processor 32 may execute code stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 36 may comprise any number of interfaces (linecards, ports) for receiving data or transmitting data to other devices. The interfaces 36 may include, for example, an Ethernet interface for connection to a computer or network.

It is to be understood that the network device 30 shown in FIG. 2 and described above is only an example and that different configurations of network devices may be used. For example, the network device 30 may further include any suitable combination of hardware, software, algorithms, processors, devices, components, or elements operable to facilitate the capabilities described herein.

Figure 3:
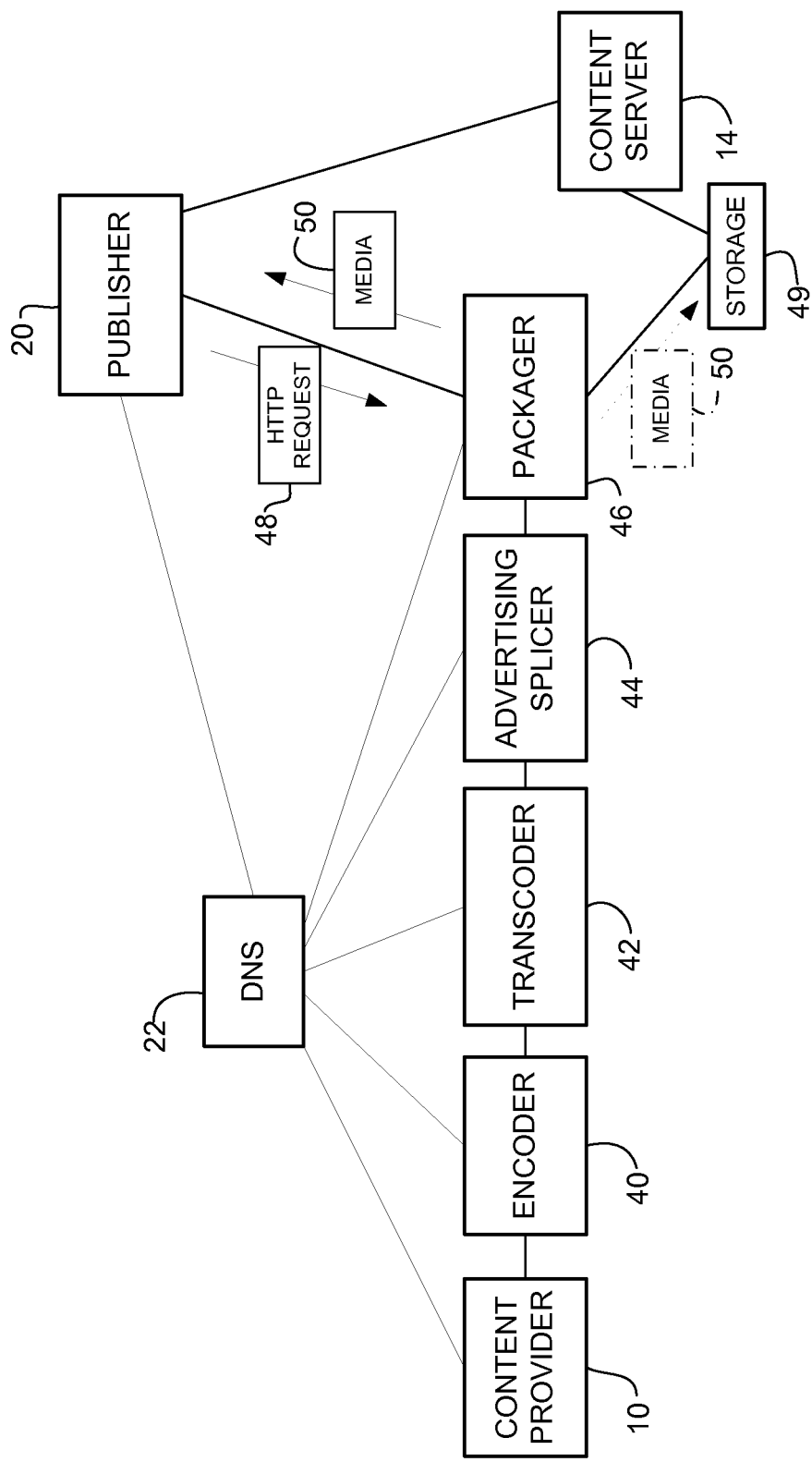
FIG. 3 is a block diagram illustrating an example of a media pipeline of the network shown in FIG. 1.

FIG. 3 illustrates an example of the media pipeline of FIG. 1, in accordance with one embodiment. In the example shown in FIG. 3, the media pipeline includes encoder 40, transcoder 42, advertising splicer 44, and packager 46. The encoder 40 takes in media feeds from the content provider 10 and encodes the content. The transcoder 42 takes in the encoded bit-stream and transcodes it into various content profiles. The advertising splicer 44 may insert one or more advertisements into the content. The packager 46 takes in the transcoded streams and converts it into vendor specific (e.g., Apple HLS) or standard (e.g., ISO BMFF) file formats. The packager 46 may also perform encapsulation or a separate encapsulator may be provided.

These components are used to provide linear content to the distribution pipeline. The elements may be packaged together or located in separate modules, running in separate processes, virtual machines, or physical machines connected together with IP (Internet Protocol), for example. It is to be understood that the components shown in FIG. 3 are only examples, and that the media pipeline may include fewer components, more components, or different processing components. For example, the media pipeline may include encapsulators, storage devices, demultiplexers, and the like. The elements may be in a linear sequence (as shown in FIG. 3), multi-forked tree, or acyclic-digraph sequence, for example.

Only the 'head' element of the media pipeline needs to deal with the peculiar loss and timing characteristics of an incoming real-time media feed. For a real-time feed, the buffering and loss mitigation only needs be done in one place. If the pipeline is doing offline acquisition (e.g., receiving movie for VoD or importing other stored content), the transformation from real-time to a chain of reliable elasticity buffers (provided by HTTP/TCP) is not needed.

The pull-based system uses unicast messages (e.g., HTTP/TCP) 48 to retrieve media from the content provider 10. Media 50 may be transmitted in-band in an HTTP response or sent in a file, or a location may be specified where the media is stored, for example. Control of the media pipeline by the last pipeline stage (publisher 20) ensures that data arrives no faster than the publisher can make it available, or buffers to temporary storage. As noted above, all losses are essentially pushed upstream to the head of the pipeline, thereby avoiding the need to introduce loss and jitter mitigation complexities in intermediate pipeline stages (as is the case in conventional systems using multicast adaptive transport streams and the like).

In one embodiment, the media 50 does not flow through the publisher 20, but instead is sent directly from the tail of the media pipeline (e.g., packager 46), as illustrated in phantom in FIG. 3. In one example, the request 48 from the publisher 20 specifies where the tail of the media pipeline should store the media. This may be, for example, in the form of a URL specifying a storage element 49 associated with the content server 14. This allows the data flow to go directly from the media pipeline to the storage element 49.

The DNS server 22 is in communication with each of the components of the media pipeline and involved at each pipeline stage. In one embodiment, the DNS server 22 is used for independent load balancing or distribution for each of the media pipeline stages. For simplification only one DNS server 22 is shown, however, there may be any number of DNS servers in the network.

Figure 4:
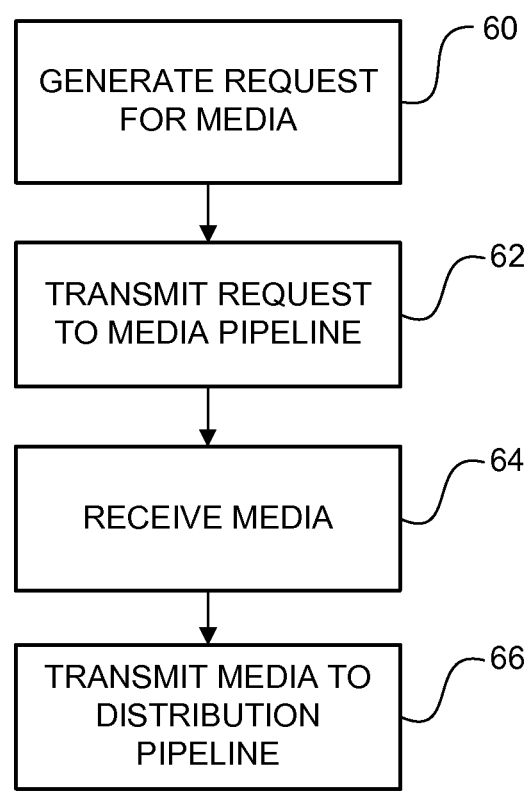
FIG. 4 is a flowchart illustrating an overview of a process for pull-based media, in accordance with one embodiment.

FIG. 4 is a flowchart illustrating an overview of a process for pull-based media, in accordance with one embodiment. At step 60, the publisher 20 generates a request for streaming media (e.g., video stream). The publisher 20 transmits a unicast request (e.g., HTTP GET request) upstream to the media pipeline (step 62). As previously described, the publisher 20 dynamically configures the chain of processing components in the media pipeline. The publisher 20 receives the requested media (step 64) and transmits the media to the distribution pipeline (step 66).

It is to be understood that the process shown in FIG. 4 and described above is only an example and that steps may be added, removed, combined, or modified, without departing from the scope of the embodiments.

In one embodiment, the media pipeline uses a URI (Uniform Resource Identifier) to identify pipeline stages and the particular media stream that the stage is to process. The URIs may be bound to a consistent name for the content source through DNS. For example, a particular stream may be named "ESPN-2-east-coast-feed". Processing elements in the pipeline all use this name and use DNS to form the processing chain. In this example, the processing chain originates at a satellite downlink box that knows how to 'tune' to this content on the downlink and demultiplex the particular channel from an MPTS. As noted above, the media pipeline can be constructed dynamically. For example, for a DASH (Dynamic Adaptive Streaming over HTTP) ABR (Adaptive Bit Rate) publisher, the publisher can issue an HTTP Get request for dash-encaps/ESPN-2-east-coast-feed/abr-for-cable-subscribers.

Upon receiving the request, the DNS uses a local search domain to project the name "dash-encaps" into the dash encapsulator service for the particular deployment (e.g., "dash-encaps.ny-metro.cablevision.com"). This in turn gets resolved through a DNS SRV (service) record to any of the instances of a DASH encapsulator that have been registered into DNS by the headend operator. The DASH encapsulator knows that it needs to get input from a multi-rate transcoder (or bank of parallel transcoders) and to tell the encoder (or encoders) to process abr-encoder/ESPN-2-east-coast-feed/abr-for-cable-subscribers via the URI that was passed to it from a downstream component.

In one example, "abr-for-cable" is a service description for transcoding that may be looked up in a database or retrieved as an XML (Extensible Markup Language) (or other format) description from another web service. The encoder 40 produces the desired output, which may be, for example, multiple elementary streams for the various rates and audio plus auxiliary streams, or an MPEG transport stream with the rates multiplexed together (FIG. 3). The encoder 40 then sends the output back on the existing HTTP connection between the transcoder 42 and encapsulator (packager) 46. The encapsulator takes the data and produces the encapsulated output that the publisher 20 asked for (e.g., ISO/BMFF (Base Media File Format), HLS (HTTP Live Streaming), HSS (HTTP Smooth Streaming)).

In one embodiment, the media pipeline is a control pipeline with media returned as a result of a Get request or sent in an independent Post transaction. In one example HTTP Get transactions are used to request the data and the data comes back in the response to the Get. In another example, the HTTP transaction may be a Put or Post, with the data being a URL (Uniform Resource Locator) that the upstream pipeline element issues a Post to, in order to move the data. This allows third party data movement, for example, when publishing to servers in a different administrative domain.

The dynamically reconfigurable pipelines named with URIs, provide failover, load balancing, exploit HTTP retries, and DNS-based host selection through service reports and redirectors. This simplifies provisioning, as new instances of each type of pipeline element need only register themselves through DNS under the corresponding service name. Furthermore, the failure model for individual pipeline stages can be fail-stop. Redundancy and resilience are provided through normal web-based recovery mechanisms using, for example, cookies or other state variables to ensure coherent output from hot or warm standby elements.

The pull-based media system may include a central management system, however, the management system is not an active element in the detailed configuration and processing of the media and need not be configured for high-reliability, as the other elements such as DNS servers, IP routers, and virtual machine managers provide reliability. Instead, the management system deals with registering pipeline element instances in DNS, keeping the metadata database aware of content, and storing authoritative provisioning information of the elements in front of the pipeline (e.g., IP multicast addresses for the various content feeds).

As can be observed from the foregoing, the embodiments described herein provide numerous advantages. For example, by switching from a conventional north-bound management system approach for configuring and managing media pipelines in a streaming media headend to a pull-oriented web-based control system, the headend can be made less complex, more robust, and scalable. The embodiments are also less susceptible to misconfiguration since the dynamic pipeline construction avoids redundant provisions of the individual elements of the pipeline. In one or more embodiments, unified naming, load distribution, and failure recovery techniques provide a more extensible system that maps better to datacenter and cloud deployment.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
generating a request for media at a publisher located at an end of a multi-stage media pipeline comprising a chain of streaming media processing components operable to receive input from a content provider, the publisher connecting the media pipeline to a distribution pipeline comprising a content delivery system and a client;
transmitting said request for media from the publisher to the media pipeline;
dynamically configuring at the publisher, the chain of streaming media processing components in the media pipeline, wherein dynamically configuring comprises building on demand the media pipeline from one or more of said media processing components wanted by the distribution pipeline;
receiving the requested media from the media pipeline at the publisher; and
transmitting at the publisher, the requested media from the media pipeline to the distribution pipeline;
wherein the media pipeline is under control of the publisher.

2. The method of claim 1 wherein said request comprises a unicast request.

3. The method of claim 1 wherein transmitting said request comprises transmitting said request on an HTTP (Hypertext Transfer Protocol) connection.

4. The method of claim 3 wherein the processing components are operable to accept HTTP connections from downstream processing components and issue HTTP connections to upstream processing components.

5. The method of claim 1 wherein said request is transmitted to a DNS (Domain Name System) comprising metadata associated with media content.

6. The method of claim 5 wherein the DNS is operable to provide load balancing in the media pipeline.

7. The method of claim 1 further comprising dynamically reconfiguring the media pipeline.

8. The method of claim 1 further comprising receiving said media in an HTTP response at the publisher and transmitting said media from the publisher to the distribution pipeline.

9. The method of claim 1 wherein said media is transmitted directly to a storage device of the distribution pipeline and said request specifies a location for storing said media.

10. The method of claim 1 further comprising storing said received media for retrieval by the distribution pipeline.

11. The method of claim 1 wherein the media pipeline is identified by a Uniform Resource Identifier (URI).

12. The method of claim 1 further comprising configuring a second redundant chain.

13. An apparatus comprising:
a processor for generating a request for media at a publisher, transmitting said request for media from the publisher to a media pipeline, dynamically configuring a chain of streaming media processing components in the media pipeline, receiving the requested media from the media pipeline, and transmitting the requested media from the media pipeline to a distribution pipeline comprising a content delivery system and a client; and
memory for storing an identifier for the media pipeline;
wherein the publisher is operable at an end of the media pipeline to connect the media pipeline to the distribution pipeline;
wherein dynamically configuring comprises building on demand the media pipeline from one or more of said media processing components wanted by the distribution pipeline; and
wherein the media pipeline is under control of the publisher.

14. The apparatus of claim 13 wherein the apparatus is configured for communication with a DNS (Domain Name System) identifying the processing components in the chain.

15. The apparatus of claim 14 wherein the DNS is operable to provide load balancing in the media pipeline.

16. The apparatus of claim 13 wherein said request comprises a unicast request.

17. The apparatus of claim 13 wherein the processing components are operable to accept HTTP connections from downstream processing components and issue HTTP connections to upstream processing components.

18. The apparatus of claim 13 wherein the identifier comprises a Uniform Resource Identifier (URI).

19. Logic encoded on one or more non-transitory computer readable media for execution and when executed operable to:
generate a request for media at a publisher operable at an end of a multi-stage media pipeline comprising a chain of streaming media processing components to connect the media pipeline to a distribution pipeline comprising a content delivery system and a client;
transmit said request for media from the publisher to the media pipeline
dynamically configure at the publisher, the chain of streaming media processing components in the media pipeline, wherein dynamically configuring comprises building on demand the media pipeline from one or more of said media processing components wanted by the distribution pipeline;
process the requested media from the media pipeline; and
transmit the requested media from the media pipeline to the distribution pipeline;
wherein the media pipeline is under control of the publisher.

20. The logic of claim 19 the media pipeline is pull-based.

* * * * *